United States Patent
Au et al.

(10) Patent No.: US 7,907,209 B2
(45) Date of Patent: Mar. 15, 2011

(54) CONTENT ADAPTIVE DE-INTERLACING ALGORITHM

(75) Inventors: Chi-Lim Oscar Au, Hong Kong (CN); Tak-Song Chong, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 1329 days.

(21) Appl. No.: 11/433,630

(22) Filed: May 12, 2006

(65) Prior Publication Data

US 2006/0268168 A1 Nov. 30, 2006

Related U.S. Application Data

(60) Provisional application No. 60/680,506, filed on May 13, 2005.

(51) Int. Cl.
*H04N 7/01* (2006.01)
(52) U.S. Cl. ........................................ 348/448; 348/452
(58) Field of Classification Search ................. 348/448, 348/616, 617, 451, 452, 458, 607; *H04N 5/21, H04N 7/01, 11/20*
See application file for complete search history.

(56) References Cited

U.S. PATENT DOCUMENTS

| | | | | |
|---|---|---|---|---|
| 5,682,205 A | * | 10/1997 | Sezan et al. | 348/452 |
| 6,118,488 A | * | 9/2000 | Huang | 348/452 |
| 7,321,400 B1 | * | 1/2008 | Chou et al. | 348/616 |
| 7,403,234 B2 | * | 7/2008 | Lertrattanapanich et al. | 348/448 |

OTHER PUBLICATIONS

S. Pigeon and P. Guillotel, "Advantages and drawbacks of interlaced and progressive scanning formats," Hamlet Rep., RACE 2110, 1996.
G. De Haan and E. B. Bellers, "Deinterlacing—An Overview," Proc. Of IEEE, vol. 86, No. 9, pp. 1839-1857, Sep. 1998.
Hoon Yoo and Jechang Jeong, "Direction-oriented interpolation and its application to de-interlacing," IEEE Transactions on Consumer Electronics, vol. 48, No. 4, pp. 954-962, Nov. 2002.
T. Chen, H.R. Wu, and Z.H. Yu, "An efficient edge line average interpolation algorithm for deinterlacing," Proc. SPIE: Visual Cmmunications and Image Processing, vol. 4067, pp. 1551-1558, 2000.
C.J. Kuo, Ching Liao and C.C. Lin, "Adaptive interpolation technique for scanning rate conversion," IEEE Transactions on Circuits and Systems for Video Technology, vol. 6, No. 3, pp. 317-321, Jun. 1996.

\* cited by examiner

*Primary Examiner* — Sherrie Hsia
(74) *Attorney, Agent, or Firm* — Schwabe, Williamson & Wyatt

(57) ABSTRACT

There is provided a method for converting an image with N rows of pixels present and N rows of pixels missing to an image with 2N rows of pixels, wherein the missing pixels are generated by performing a deinterlacing algorithm. The algorithm determines whether missing pixels are part of a horizontal edge region, a smooth region, a vertical edge region or a texture region. Based on the determination, a deinterlacing method is selected.

62 Claims, 7 Drawing Sheets missing field →

X=B missing field →

X=(B+E)/2 upper reference line
missing line
lower reference line

CONTENT ADAPTIVE DE-INTERLACING ALGORITHM

CROSS-REFERENCE TO RELATED APPLICATIONS

This application claims priority from U.S. Provisional Application No. 60/680,506, filed May 13, 2005, which is hereby incorporated herein by reference in its entirety.

FIELD OF THE INVENTION

This invention relates generally to digital signal processing, decoding and representation, and more particularly to a video deinterlacing system, an interpolation system or an image interpolation system in which a new line of pixels is inserted between two currently available lines and having both device and method aspects. It further relates to a computer program product, such as a recording medium, carrying program instructions readable by a computing device to cause the computing device to carry out a method according to the invention.

BACKGROUND OF THE INVENTION

Interlaced video has been widely adopted by current TV transmission standards, including PAL, NTSC and SECAM, because it can reduce large area flicker without an increase in transmission bandwidth. It is also used in digital TV systems in which the digital video signal may be encoded by MPEG-1/2/4, H.261/3/4, or a Chinese standard called AVS. However, it introduces several visual artifacts such as edge flicker, interline flicker, and line crawling. In contrast, progressive video has been adopted by the PC community and internet broadcasting, because it does not have the visual artifact in interlaced video and simplifies many image-processing tasks. In order to provide compatibility with existing TV transmission standards, de-interlacing is needed to convert interlaced video to progressive video. In addition, the current digital TV system supports both interlaced and progressive video, both standards will therefore continue to co-exist in the future and de-interlacing algorithms are needed for interoperability between interlaced and progressive video systems.

NTSC video has 30 frames per second (fps) with a resolution of 720×480 pixels for each frame. PAL and SECAM video have 25 fps with a resolution of 720×576 pixels. In these interlaced video systems, there are 2 fields in each frame as shown in FIG. 1. One field is called the upper field or even field and consists of all the even lines (line 0, 2, 4, and so on) of the frame captured at a time t1. The second field is called the lower field or odd field, and it contains all the odd lines (lines 1, 3, 5, and so on) of the frame captured at time t2. The time t1 is earlier than t2 by $\frac{1}{60}^{th}$ second in the case of 30 fps or $\frac{1}{50}^{th}$ second in the case of 25 fps. If one frame has N lines, then a field is a vertically-subsampled version of the frame (thus called field instead of frame) containing N/2 lines. The upper field and lower field are interleaved together to form a frame for transmission and storage. If there is motion between the two fields, some "comb" artifacts are present.

The problem of deinterlacing is how to generate a frame given only a single field (even or odd). In other words, given a vertically-subsampled frame (an even or odd field), deinterlacing is the problem of how to interpolate or generate the missing lines. The present invention relates to a novel deinterlacing algorithm.

One of the simplest deinterlacing algorithms is zero-order-hold (also called line doubling) as shown in FIG. 2, in which a line is simply repeated to fill up the missing line. In other words, each missing pixel X is copied from the corresponding top pixel B. The zero-order-hold algorithm suffers from severe staircase artifacts. Another simple deinterlacing algorithm is vertical-averaging as shown in FIG. 3, in which the missing line is generated as the average of the two neighboring lines. In other words, each missing pixel X is the average of the corresponding top pixel B and the bottom pixel E. The line-averaging tends to blur the image significantly, especially around edges.

Most other existing deinterlacing algorithms estimate the edge orientation by defining a correlation measurement and interpolates the missing pixel along the estimated edge direction. One well-known spatial de-interlacing algorithm is edge-based line averaging (ELA). The ELA algorithm utilizes the directional correlation between pixels to estimate the edge orientation and interpolate the missing field along the edge direction. The directional correlation is defined in terms of pixel intensity change along a certain direction. ELA performs well in regions with a dominant edge because the edge direction can be estimated accurately. However, in high frequency regions or horizontal edge regions, poor visual quality may result due to inaccurate estimation of edge orientation. In addition, the number of directions for interpolation is fixed, which implies the algorithm cannot adapt to local image characteristics. For images with a near horizontal edge, the most correlated direction may not be included in the testing and this can result in a poor deinterlaced frame. To produce high quality deinterlaced frames for images with different edge orientation, the simplest way is to increase the number of directions to be tested. However, increasing the number of directions generally increases the chance of getting errors because the correlation measurement cannot perfectly represent the directional correlation for the missing pixel.

Due to the weakness of the existing ELA algorithm, several algorithms have been proposed for converting interlaced video into progressive format. The E-ELA tries to improve the accuracy of ELA by introducing additional measurement. First, it classifies the edge direction into three sides: bias left, vertical and bias right by the pixel intensity change along the −45 deg, vertical and +45 deg directions. Then it applies the traditional ELA algorithm on only one side. The A-ELA tries to interpolate the missing pixels in horizontal edge regions by a majority principle. The 3×3 neighbors are divided into two clusters and the one that has more elements is averaged to produce the missing pixels.

SUMMARY OF THE INVENTION

In one aspect of the present invention, there is provided a method for converting an image with N rows of pixels present and N rows of pixels missing to an image with 2N rows of pixels. In one example, the missing pixels are generated by performing a deinterlacing algorithm, comprising: (a) determining whether missing pixels comprise part of a horizontal edge region, a smooth region, a vertical edge region or a texture region; and (b) selecting a deinterlacing method dependent on the result of the determination in step (a).

The horizontal edge detection may be performed, for example, by the steps of: for each missing pixel, computing a measure of the local horizontal high frequency activity and a measure of the local vertical high frequency activity, and declaring the pixel as a "horizontal edge pixel" when the horizontal activity is low and the vertical high frequency activity is high. The local vertical high frequency activity measure may be obtained, for example, from the output of a vertical high pass filter; and the local horizontal high frequency activity measure may be obtained from the output of a horizontal high pass filter. The definition of the high pass filters may be different for different pixels. A possible high frequency activity measure is the energy of the high pass filter. Preferably, the high pass filters operate only on the existing pixels within a local neighborhood.

In the event that missing pixels are classified as "horizontal edge pixels" a vector matching deinterlacing method may be applied to each missing pixel.

In a preferred embodiment, the vector matching deinterlacing method comprises the steps of: (a) choosing a local vector by combining several consecutive horizontal pixels, (b) choosing adaptively a search range which contains candidate directions to be considered; (c) computing a mismatch measure between the two adjacent lines for each of the candidate directions in the chosen search range, using all the pixels corresponding to the grouped adjacent "horizontal edge pixels"; (d) choosing the direction that gives minimum mismatch, and (e) generating a value for the missing pixel by taking the average of the pixel values in the previous line and the next line in the chosen direction.

Preferably, the consecutive horizontal pixels are in the same row. The local vector may be chosen, for example, by grouping adjacent "horizontal edge pixels" together to form a vector. Preferably, the search range is greater than or equal to (L+2)/2, where L is the number of adjacent "horizontal edge pixels" grouped together to form the local vector. The mismatch measure may be the sum of absolute error, or sum of square error, or other functions. Preferably, the same direction is chosen for all the adjacent "horizontal edge pixels" grouped together to form the local vector. Preferably, each of the candidate directions would be removed unless the current "horizontal edge pixel" is part of a line of significant length in that candidate direction.

In a preferred embodiment, for a current "horizontal edge pixel" at location (i,j), a candidate direction k would be removed unless the pixels at (i−2, j−2k) and (i−4, j−4k) are both "horizontal edge pixels", or the pixels at (i−2, j−2k) and (i+2, j+2k) are both "horizontal edge pixels", or the pixels at (i+2, j+2k) and (i+4, j+4k) are both "horizontal edge pixels".

In a preferred embodiment, for each "horizontal edge pixel" at location (i, j), a horizontal edge consistency indicator p(i, j, k) for candidate direction k would initially be set to 0, but would be changed to 1 if the pixels at (i−2, j−2k) and (i−4, j−4k) are both "horizontal edge pixels", or the pixels at (i−2, j−2k) and (i+2, j+2k) are both "horizontal edge pixels", or the pixels at (i+2, j+2k) and (i+4, j+4k) are both "horizontal edge pixels"

and wherein for a current "horizontal edge pixel" at location (i, j), a candidate direction k would be removed unless the sum of the horizontal edge consistency indicator for k of adjacent "horizontal edge pixels", that are grouped together to form the local vector, is larger than a threshold.

In one example, if the missing pixels are classified as belonging to a vertical edge region, a modified edge-based line averaging algorithm is employed by, for example, computing a mismatch measure in several possible directions using a fixed neighborhood of pixels, and choosing the edge direction that gives the minimum mismatch.

If the missing pixels are classified as belonging to a texture region a vertical averaging algorithm may be employed.

If the missing pixels are classified as belonging to a smooth region, a vertical averaging algorithm may be employed, or a modified edge-based line averaging algorithm may be employed by computing a mismatch measure in several possible directions using a fixed neighborhood of pixels, and choosing the edge direction that gives the minimum mismatch.

According to another aspect of the invention, there is provided a computer program product for converting an image with N rows of pixels present and N rows of pixels missing to an image with 2N rows of pixels. In one example, the computer program product generates the missing pixels by performing a deinterlacing algorithm, comprising (a) determining whether missing pixels comprise part of a horizontal edge region, a smooth region, a vertical edge region or a texture region; and (b) selecting a deinterlacing method dependent on the result of the determination in step (a).

According to a still further aspect of the present invention, there is provided a system for converting an image with N rows of pixels present and N rows of pixels missing to an image with 2N rows of pixels. In one example, the system comprises: (a) means for determining whether missing pixels comprise part of a horizontal edge region, a smooth region, a vertical edge region or a texture region; (b) means for selecting a deinterlacing method dependent on the result of the determination in step (a), and means for performing the deinterlacing method selected in step (b).

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

The present invention comprises a deinterlacing algorithm that may be called content adaptive de-interlacing (CADI). CADI analyzes the local image characteristics and classifies each local neighborhood into smooth, horizontal edge, vertical edge and texture classes and chooses the most appropriate de-interlacing method among three methods: vertical averaging, modified-ELA (MELA), and Vector Matching (VM). Vertical averaging is described above and is used in texture regions. Vector matching is a novel method for interpolating missing pixels in horizontal edge regions. The MELA is an extension of ELA and is for the other image regions. Both MELA and VM will be described below.

Figure 1:
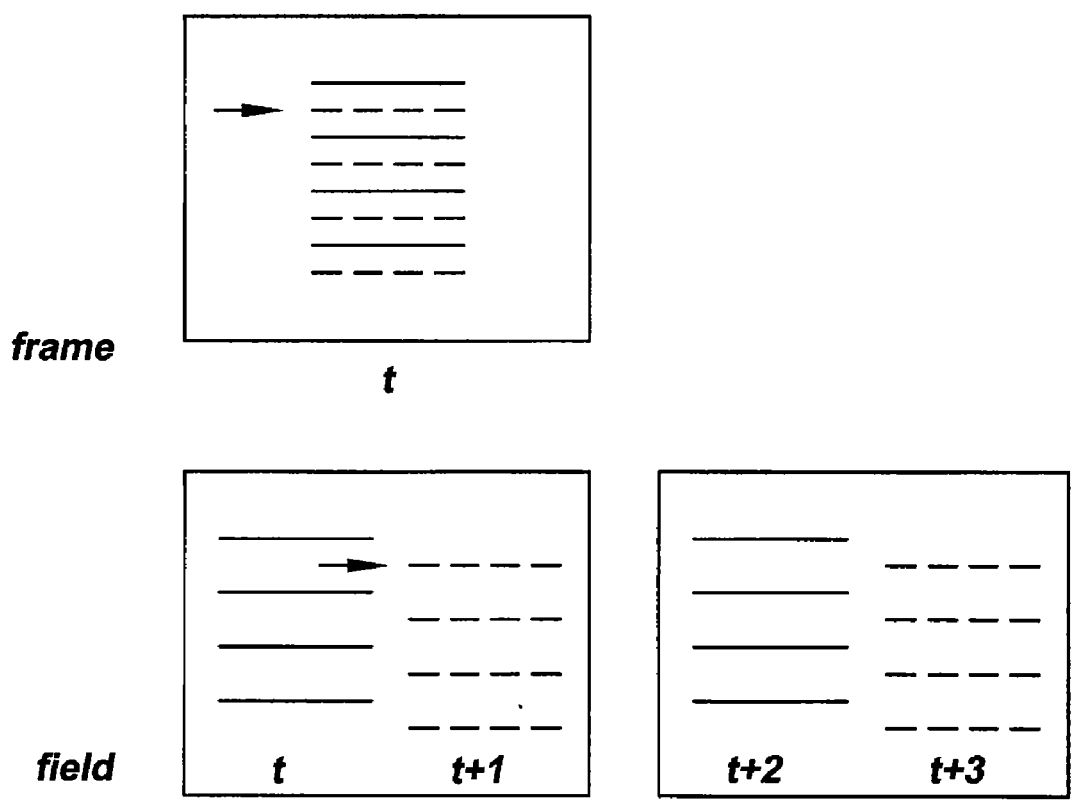
FIG. 1 illustrates the concept of interlaced video with 2 fields per frame.
Figure 2:
FIG. 2 illustrates the principle of line doubling (each X is copied from top pixel B) as used in a prior art algorithm.
Figure 3:
FIG. 3 illustrates the principle of vertical averaging (each X is the average of top and bottom pixels) as used in a prior art algorithm.
Figure 4:
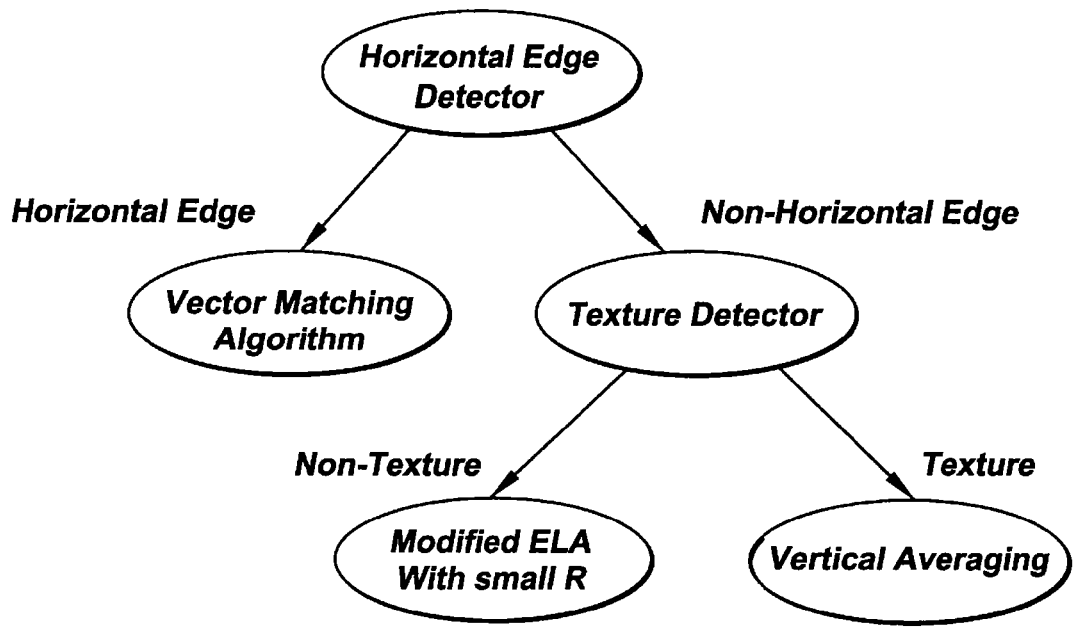
FIG. 4 shows schematically the structure of the texture detector in one example of the invention.

Firstly, each field is passed through a texture analyzer, which classifies each missing pixel into four different categories: smooth region, vertical edge region, horizontal edge region and texture region. The texture analyzer consists of two main components: a horizontal edge detector and a texture detector as shown in FIG. 4. The texture detector decides if a missing pixel is part of a texture region (in which case it is subject to vertical averaging) or if it is non-texture (i.e., a pixel forming part of a smooth area or a vertical edge) in which case it is subject to modified ELA with a small value for R.

The horizontal edge detector detects a horizontal edge by high pass filters and the texture detector employs the modified-ELA to detect texture. Based on the classification result, different de-interlacing algorithms are activated in order to obtain the best performance as shown in Table 1.

TABLE 1

| | | Dominant edge | | |
| --- | --- | --- | --- | --- |
| | Smooth | vertical | horizontal | Texture |
| De-interlacing algorithm | M-ELA with small R OR vertical averaging | M-ELA with small R | Vector Matching Algorithm | vertical averaging |

Both vertical averaging and MELA provide satisfactory results in smooth area. However, MELA is more suitable for area with a dominant edge, because the pixels are more correlated along the edge direction. For texture areas, the estimation of edge orientation by MELA is not accurate. So vertical averaging is preferred and the missing pixel is interpolated by the closest neighboring pixels, which generally has the highest correlation.

Current ELA uses a fixed search range R, which cannot adapt to different orientations of the edge. For vertical edges, a small search range can be used, while a large range is essential for horizontal edges. However, a large search range increases the chance of getting errors because of an increase in the number of candidate directions. Therefore, a vector-matching algorithm with an adaptive search range is proposed. This vector-matching algorithm has three features to improve the performance of de-interlacing: search range estimation for estimating the minimum required search range; grouping consecutive pixels in an edge into a single matching vector for directional correlation estimation; and checking the consistency of horizontal edge information in each candidate direction. The vector-matching algorithm shows a much higher accuracy in estimating the orientations of horizontal edges and will be described in a later section.

Horizontal Edge Detector

The horizontal edge detector detects a horizontal edge by high pass filtering. The pixel $f(i,j)$ is declared to be a horizontal edge if the following equations (Eqn. 4, and Eqn. 5) are both satisfied:

$$abs(2f(i-1, j) - f(i-1, j-1) - f(i-1, j+1)) + \\ abs(2f(i+1, j) - f(i+1, j-1) - f(i+1, j+1)) < T_1 \quad (4)$$

$$\sum_{m=-1}^{1} abs(f(i-1, j+m) - f(i+1, j+m)) > T_2 \quad (5)$$

where $T_1$ and $T_2$ are predefined thresholds. Eqn. 4 requires the horizontal high frequency energy to be small, while Eqn. 5 requires the vertical high frequency energy to be large.

Upon detection of a horizontal edge, the horizontal edge indicator $H(i,j)$ is set to 1, else $H(i,j)$ is set to 0.

Texture Detector

The texture detector employs the modified-ELA (MELA) and classifies the missing pixel to be texture if there is an inconsistency in edge direction. Let the estimated interpolation direction determined by MELA be $D(i,j)$. The pixel $f(i,j)$ is declared to be texture if:

$$var(D(i,j-1), D(i,j), D(i,j+1)) > T_3 \quad (6)$$

where var(.) denotes variance operator and $T_3$ is a predefined threshold.

Modified ELA (M-ELA)

An ELA-like algorithm is employed for vertical edge and smooth regions because ELA tends to perform well in regions with a dominant edge as it estimates the edge direction. However, traditional ELA performs poorly in some special cases due to inaccurately estimating edge direction. To ensure that ELA produces minimum error, ELA is modified to become modified-ELA (MELA) as follows:

Let $f(i,j)$ be the current to-be-interpolated pixel in the i-th row and j-th column, and let the function $C(k)$ be a correlation measurement for direction k, which is defined as:

$$C(k) = \sum_{m=j-1}^{j+1} (f(i-1, m-k) - f(i+1, m+k))^2 \quad (1)$$

The measurement $C(k)$ is the intensity change in the candidate direction k. The modified ELA (M-ELA) has a higher accuracy over traditional ELA because it considers the intensity change in the neighboring pixels and gives a more consistent estimated edge direction. In addition, it allows the value of k to be a fractional value and the pixel intensity in sub-pixel location is interpolated by a bilinear function The estimated edge direction or interpolation direction D is the one that minimizes $C(k)$, such that:

$$D = \arg\min_{-R \le k \le R}(C(k)) \quad (2)$$

and the missing pixel $f(i,j)$ is interpolated by simple averaging along the edge direction:

$$f(i,j) = (f(i-1, j-D) + f(i+1, j+D))/2 \quad (3)$$

Vector Matching (VM)

The vector matching (VM) algorithm is activated upon detection of a horizontal edge and has three features to improve the accuracy of estimating edge orientation in the horizontal edge area. First, the search range R is adaptive according to different edge orientations and the minimum required search range for direction estimation is estimated. The search range estimation process gives a smaller value of R if the edge is more vertical, which can reduce the number of candidate directions, and it gives a larger value of R if the edge is more horizontal, which allow the pixels to be interpolated along the edge direction. Second, the proposed vector matching algorithm combines consecutive pixels within an edge region into a single matching vector for direction estimation. By estimating the correlation of a group of pixels (matching vector) instead of individual pixels, the accuracy of estimating edge orientation can be improved. Third, a consistency test along each candidate direction is performed. In the consistency test, it is assumed that the horizontal edge is a few pixels height and pass through several scan lines. For each candidate direction, the availability of horizontal edge is examined. A consistency in horizontal edge availability suggests the existence of a horizontal edge and the candidate direction is reliable. In the vector matching algorithm, only the candidate directions that pass the consistency test will be taken into account for the interpolation of missing pixels.

The vector-matching algorithm comprises two steps, the first step is search range estimation, which estimates the minimum required search range for direction estimation. The second step is constrained direction estimation, which exploits the directional correlation of the matching vector along the reliable candidate directions.

Search Range Estimation

Figure 5:
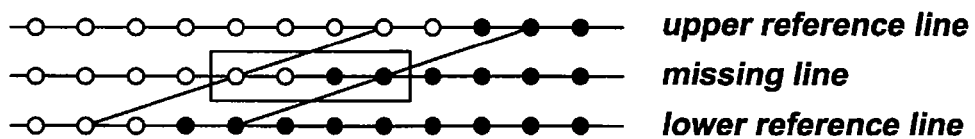
FIG. 5 shows for explanation a number of pixels in a horizontal edge region and the best interpolation direction.

Consider a horizontal edge with gradient 1:G. The best search range should be equal to or larger than the gradient G because the pixels are more correlated along the edge direction. FIG. 5 shows an edge with gradient 1:3 and the pixels in the edge region (pixels within the rectangle in FIG. 5) have a best interpolation direction D of −3, i.e., three pixels offset toward right. If the search range R is smaller than gradient G, the best interpolating direction will never be detected and will result in poor interpolated pixels.

Let the number of pixels in the horizontal edge region be L (the number of pixels within the rectangle in FIG. 5), which is the number of consecutive pixels with horizontal indicator H(i,j) equal to 1. These points share the characteristics that they are similar to both the left and right neighboring pixels, but are significantly different from either the upper or lower neighbors. The gradient G and L has the following relation:

$$L = 2G - 2 \quad (7)$$

Since the search range R should be larger or equal to gradient G, the minimum required search range R is:

$$R = (L+2)/2 \quad (8)$$

Constrained Direction Estimation

In constrained direction estimation, the pixels in the horizontal edge region are combined to use the same matching vector v. Equivalently, for consecutive pixels with H(i,j)=1, a row vector is formed:

$$v = [f(i,j_1) f(i,j_1+1) f(i,j_1+2) \ldots f(i,j_2)]$$

where $f(i,j_1)$ and $f(i,j_2)$ are the left-most pixel and the right-most pixel in the horizontal edge region respectively. In addition, let the upper reference vector U(k) and lower reference vector L(k) be:

$$U(k) = [f(i-1,j_1-k) f(i-1,j_1+1-k) \ldots f(i-1,j_2-k)]$$

$$L(k) = [f(i+1,j_1+k) f(i+1,j_1+1+k) \ldots f(i+1,j_2+k)]$$

The correlation measurement C(k) is $$C(k) = |U(k) - L(k)|^2 \quad (9)$$

where |.| denotes vector norm.

The estimated edge direction D is the one which minimizes C(k):

$$D = \arg\min(C(k))$$
$$k \in S$$

k belongs to the set S if there exists a horizontal edge orientated in the direction k, which is described as follows.

Let p(i,j,k) be a horizontal edge consistency indicator. The p(i,j,k) is set to be 1 if:

$$(H(i-2,j-2k)=1 \text{ and } H(i-4,j-4k)=1) \quad (10)$$

$$\text{OR } (H(i-2,j-2k)=1 \text{ and } H(i+2,j+2k)=1) \quad (11)$$

$$\text{OR } (H(i+2,j+2k)=1 \text{ and } H(i+4,j+4k)=1) \quad (12)$$

The horizontal edge consistency indicator examines the availability of horizontal edge along the candidate direction k. Equation 10 is satisfied if there exists a horizontal edge passing through the missing pixels in direction k, while equations 11, 12 are satisfied if the missing pixels are located at the end of a horizontal edge. Furthermore, $$k \in S \quad \text{if} \quad \sum_{j=j1}^{j2} p(i,j,k) > w*L \quad \text{and} -R \leq k \leq R$$

where w∈[0,1] is a parameter to control the strictness of the consistency test.

To ensure the directional correlation is high, the correlation measurement is checked against a predefined threshold. If the minimum value of C(k) per pixel is smaller than the threshold, all the pixels in the matching vector v are interpolated along the estimated edge direction D by simple averaging, otherwise, vertical averaging is applied.

Experimental Results

The proposed CADI algorithm according to an aspect of the invention is compared with other existing de-interlacing algorithms. In the comparison, several well-known progressive video sequences are artificially converted to interlaced video by alternative sub-sampling. The odd field in odd frame and the even field in even frame are removed. The interlaced version is then de-interlaced by different de-interlacing algorithms and the de-interlaced videos are compared with the original video sequences.

Table 2 shows the PSNR of de-interlaced videos of different de-interlacing algorithms, including line doubling, ELA, E-ELA, A-ELA and the proposed CADI algorithm. In Table 2, the proposed CADI shows better performance than all other existing algorithms in a wide range of sequences. This suggests that the proposed algorithm can adapt to different image characteristics and produces high quality video frames.

TABLE 2

|  | Line Doubling | ELA | A-ELA | E-ELA | Proposed CADI |
|---|---|---|---|---|---|
| akiyo_cif | 33.96 | 37.94 | 39.32 | 37.26 | 40.14 |
| children_cif | 26.98 | 31.23 | 31.83 | 30.2 | 32.17 |
| dancer_cif | 33.76 | 37.26 | 37.43 | 36.84 | 37.91 |
| deadline | 27.18 | 28.63 | 29.55 | 27.83 | 30.44 |
| foreman_cif | 27.91 | 30.84 | 30.92 | 30.18 | 31.28 |
| missA_cif | 35.02 | 37.76 | 38.02 | 37.2 | 38.35 |
| news | 28.23 | 31.81 | 33.1 | 30.83 | 33.51 |
| paris_cif | 23.41 | 25.3 | 26.09 | 24.88 | 26.31 |
| sean_cif | 29.01 | 31.95 | 33.11 | 31.67 | 33.75 |

TABLE 2-continued

|  | Line Doubling | ELA | A-ELA | E-ELA | Proposed CADI |
|---|---|---|---|---|---|
| silent_cif | 28.32 | 30.88 | 31.02 | 30.18 | 31.24 |
| singer_cif | 30.09 | 33.49 | 33.81 | 31.9 | 34.35 |
| table_cif | 24.45 | 27.14 | 28.05 | 26.77 | 28.65 |
| weather_cif | 23.28 | 29.19 | 29.35 | 28.21 | 29.97 |

Table 3 compares the PSNR of de-interlaced videos of different de-interlacing algorithms on horizontal region only with H(i,j)=1. The proposed CADI shows superior performance over other existing algorithms. In particular, in the table sequence, the present invention outperforms other existing algorithms by at least 0.96 dB. This is because there is a very long horizontal edge in the video sequence, and only the proposed CADI algorithm of the present invention can accurately estimate the orientation of edge.

TABLE 3

|  | Line Doubling | ELA | A-ELA | E-ELA | Proposed CADI |
|---|---|---|---|---|---|
| akiyo_cif | 17.09 | 24.09 | 23.34 | 23.01 | 24.81 |
| children_cif | 16.24 | 22.19 | 22.05 | 19.84 | 22.06 |
| dancer_cif | 16.5 | 21.13 | 20.73 | 20.15 | 21.12 |
| deadline | 15.18 | 19.82 | 19.6 | 17.07 | 19.79 |
| foreman_cif | 16.43 | 22.09 | 21.51 | 20.42 | 22.48 |
| missA_cif | 18.35 | 24.7 | 24.67 | 23.35 | 24.89 |
| news | 16.55 | 22.87 | 22.78 | 19.74 | 22.83 |
| paris_cif | 13.19 | 16.82 | 16.88 | 15.75 | 17.04 |
| sean_cif | 17.06 | 22.78 | 22.26 | 21.82 | 22.87 |
| silent_cif | 16.48 | 22.24 | 22.01 | 20.24 | 22.18 |
| singer_cif | 18.56 | 24.04 | 23.74 | 20.59 | 24.01 |
| table_cif | 12.97 | 17.3 | 17.23 | 16.38 | 18.26 |
| weather_cif | 14.06 | 20.48 | 19.99 | 17.9 | 20.43 |

Figure 6:
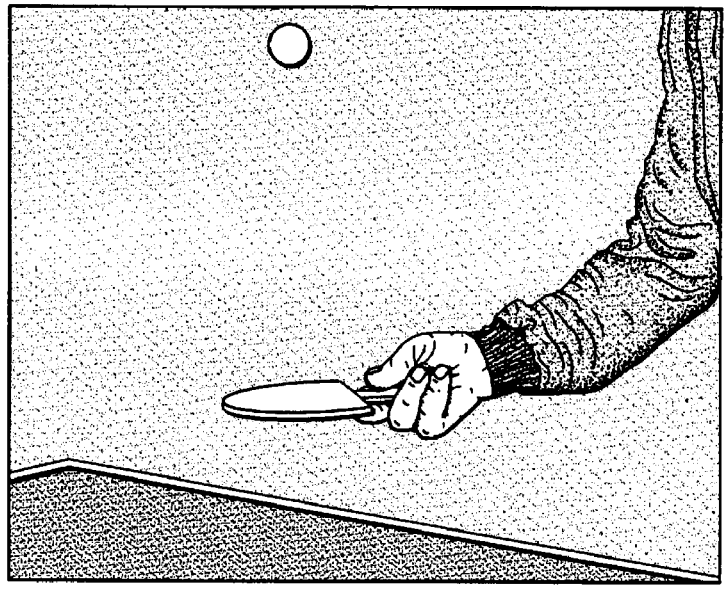
FIG. 6 shows a frame from a standard video sequence deinterlaced with one example of the invention.

FIG. 6 shows a typical interpolated frame of the table tennis sequence using CADI according to an embodiment of the invention. In the shown frame 20, the edge of the table is nearly horizontal. The proposed CADI gives perceptually much better interpolated frames with little saw tooth artifacts in the horizontal edge region and outperforms other existing algorithms. This suggests that the proposed CADI manages to estimate the edge orientation more accurately and has superior performance over existing de-interlacing algorithm.

Figure 7:
FIG. 7 shows a frame from another standard video sequence deinterlaced with an embodiment of the invention.

FIG. 7 shows a typical interpolated frame (frame 12) of the Sean sequence using CADI according to an embodiment of the invention. Frame 12 of the sequence contains several typical image characteristics: region with dominant edges (e.g. shoulder), thin line structures (e.g. collar), texture regions (e.g. leaves) and smooth areas (e.g. wall). In frame 12, there are several artifacts in the deinterlaced frame: the saw tooth artifacts on the shoulder, the broken line on the collar and the artificial high frequency on the leaves. The proposed algorithm does not produce any artifacts on the deinterlaced frame while other existing algorithms tend to produce one or more artifacts. This shows that the proposed CADI algorithm can adapt to local image characteristics and produce high quality deinterlaced frames in different situations.

Figure 8:
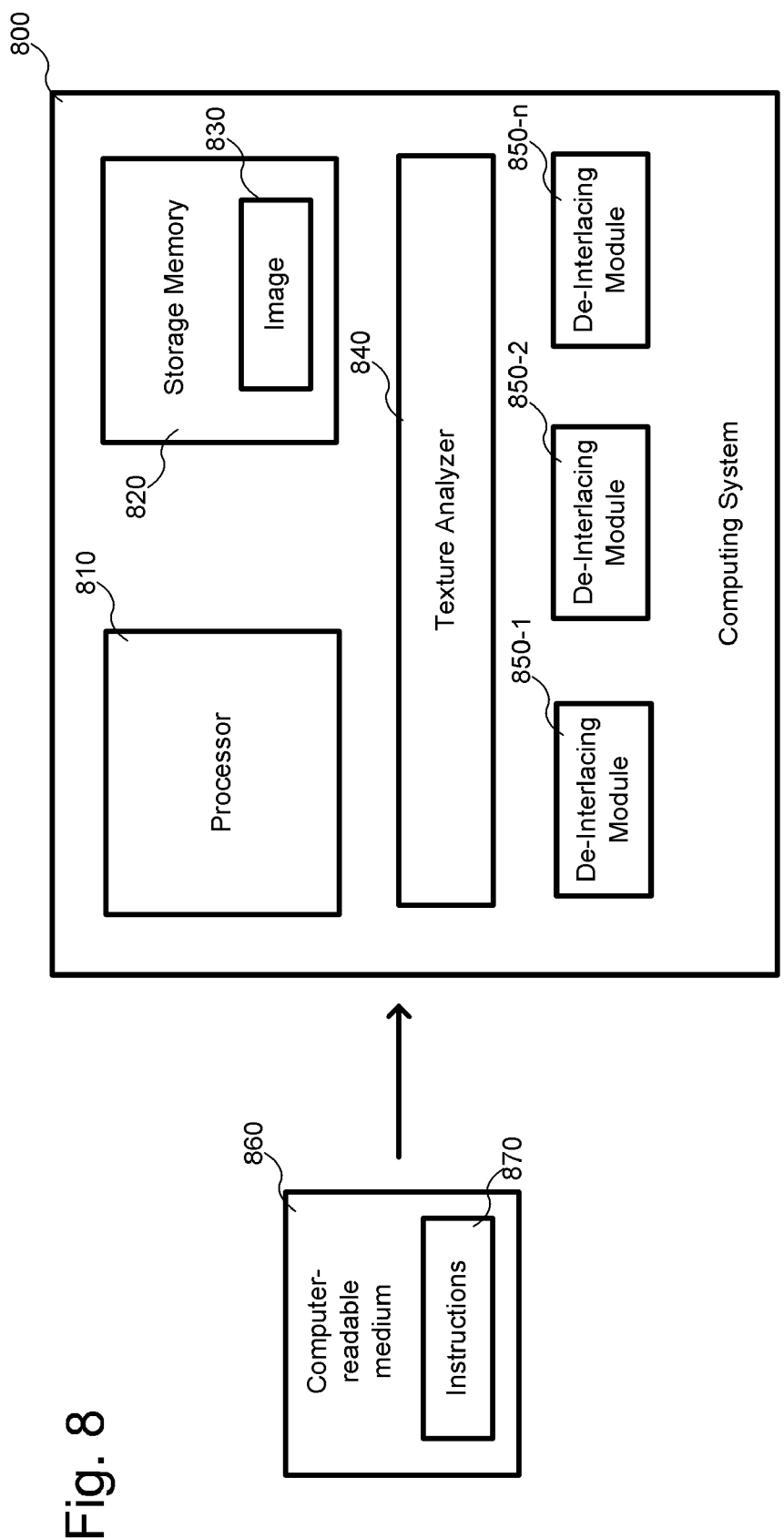
FIG. 8 shows a block diagram illustrating components of an example system used to implement embodiments described herein.

FIG. 8 shows a block diagram illustrating components of an example computing system 800 used to implement embodiments described herein. The computing system 800 may comprise a processor 810 and a storage memory 820. The storage memory 820 may contain one or more images 830 on which described embodiments may operate. The computing system 800 may also comprise a texture analyzer 840, such as is described above, and illustrated at FIG. 4. The computing system may also comprise a plurality of de-interlacing modules 850-1 through 850-n, which may each implement the de-interlacing embodiments described herein. One or more operations performed by the texture analyzer 840 and/or the de-interlacing modules 850-1 through 850-n may be described by instructions 870, which are contained on a computer-readable medium 860, as described herein.

Figure 9:
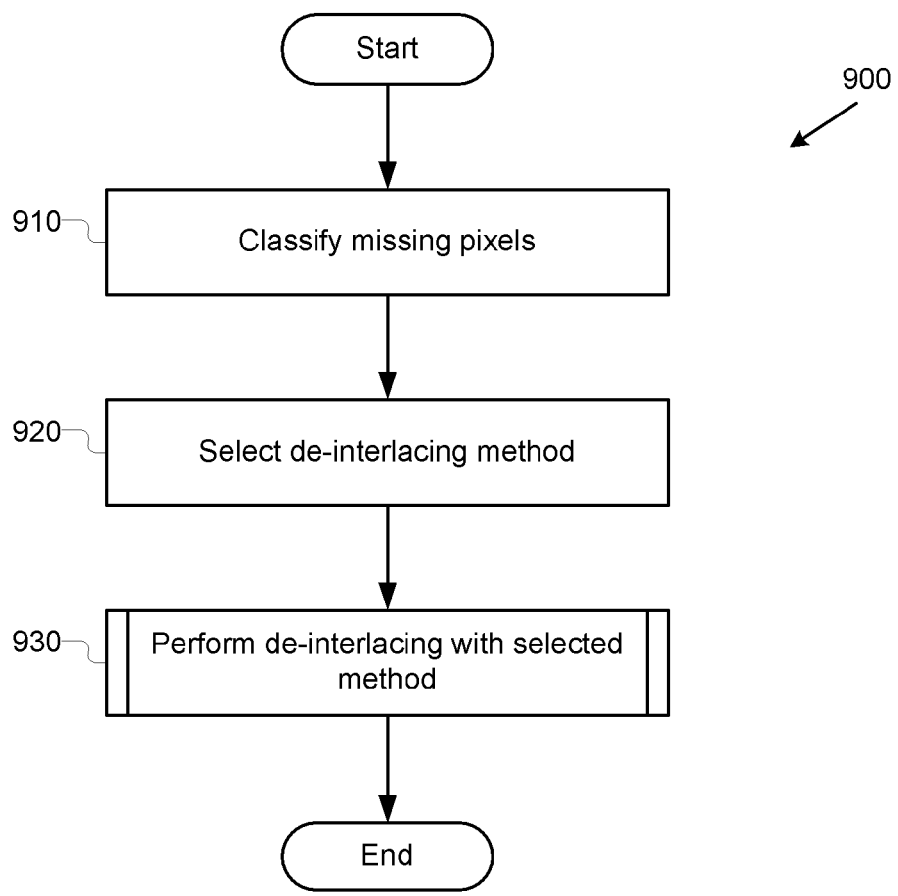
FIG. 9 shows a flowchart illustrating an example process for performing de-interlacing according to embodiments described herein.

FIG. 9 shows a flowchart illustrating an example process 900 for the computing system 800 to perform de-interlacing according to embodiments described herein. The process may begin at operation 910, where the texture analyzer 840 classifies one or more missing pixels into different categories, such as smooth region, vertical edge region, horizontal edge region and texture region. At operation 920, the system 800, such as in the texture analyzer 840, may select an appropriate de-interlacing method from among a plurality of methods. At operation 930, the system 800 may then perform de-interlacing using the selected method. The process then may end.

Figure 10:
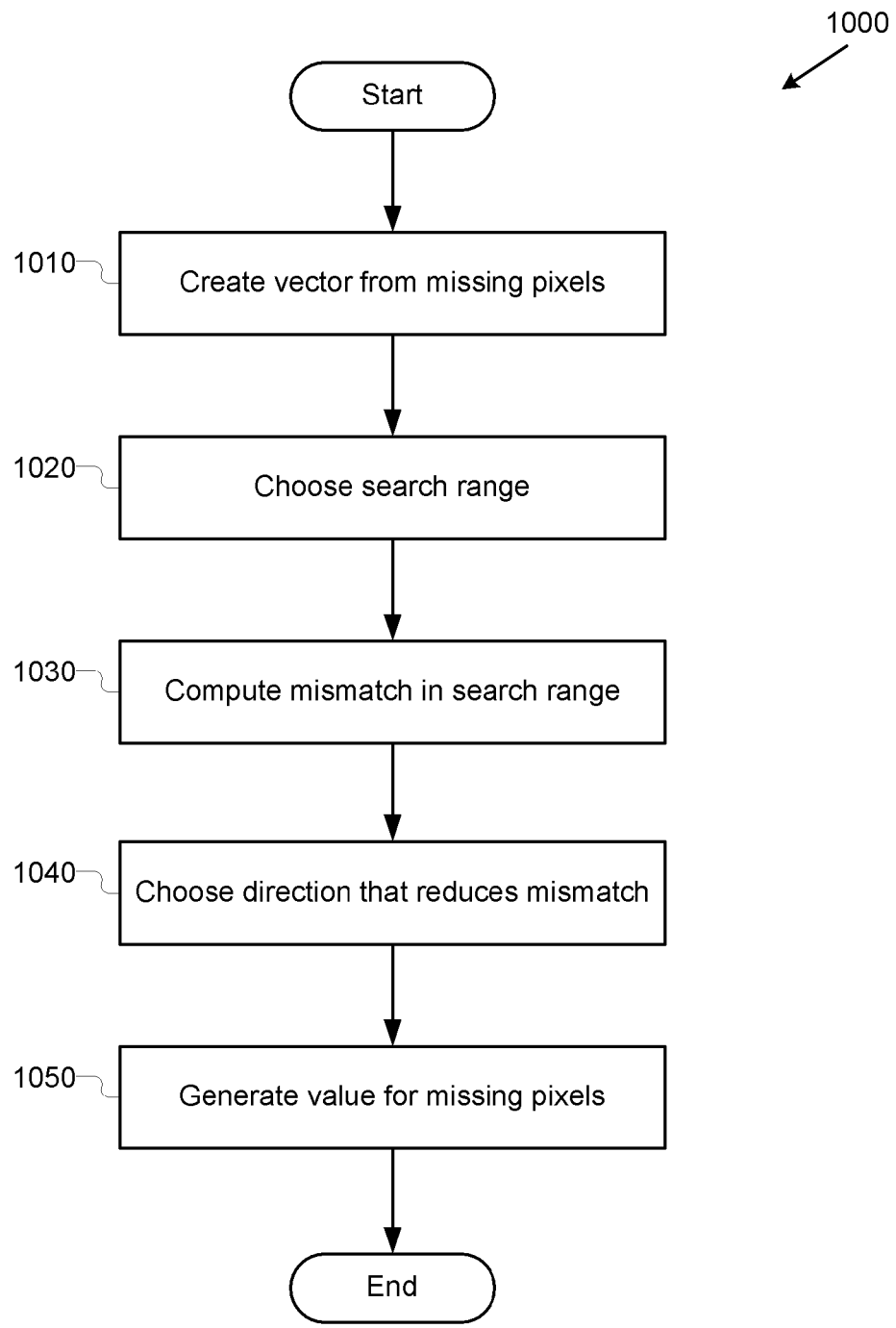
FIG. 10 shows a flowchart illustrating an example process for performing a example de-interlacing technique according to embodiments described herein.

FIG. 10 shows a flowchart illustrating an example process 1000 for the computing system 800 to perform a example de-interlacing technique according to embodiments described herein, such as in the vector matching embodiments described above. The process may begin at operation 1010, where a vector may be created from missing pixels in an interlaced image. At operation 1020, a search range may be chosen which contains candidate directions to be considered. At operation 1030, a mismatch measure may be computed between adjacent lines for the candidate directions in the chosen search range. At operation 1040, a direction may be chosen that reduces mismatch. At operation 1050, a value may be generated for the missing pixels in the created vector by taking an average of pixel values in the chosen direction. The process then may end.

It will be understood by those skilled in the art that while all the description above is in terms of rows assuming that alternate rows in an image are missing, the present invention may be applied similarly when alternate columns in an image are missing, by applying the method to the transpose of the image. Similarly the method can also be applied when alternate rows and alternate columns in an image are missing by applying the method to the rows first and then to the columns.

It will be understood by those skilled in the art that while the terms "horizontal" and "vertical" have been used in the description and the following claims, they are not intended to be unduly limiting and should not be construed literally. In particular, if as explained in the preceding paragraph, the present invention were to be applied to an image formed from vertical columns of pixels, the terms "horizontal" and "vertical" would have to be interchanged where they appear. An alternative way of considering this is to give "horizontal" and "vertical" non-literal definitions and instead to define "horizontal" as meaning "in the same direction as lines forming the image" and "vertical" as meaning "in a direction perpendicular to lines forming the image".

The method may also be applied recursively to perform interpolation at a factor of 2:1, 4:1, 8:1, and so on in the horizontal direction, and can be applied similarly to the vertical direction.

It will also be understood that the method may be applied firstly in the horizontal direction, and then in the vertical direction, and this may result in a recursive enlargement of the image. For example, the method may be applied horizontally to an N×N image to give a N×2N image, and then may be applied vertically to give a 2N×2N image.

It will also be understood that by applying the method to a sequence of frames video deinterlacing may be achieved.

It should also be noted that the present invention provides a spatial method that may be combined with any conventional temporal de-interlacing method. This combination of methods may be carried out in a number of different ways. For example, either the spatial method of the present invention or a conventional temporal method may be set as the default method which will be used if it is thought likely to give a good result, but then the other method may be used as an alternative if the default method is not effective.

Another possibility is that horizontal edge detection may be performed first, and if a horizontal edge region is detected then vector matching is performed to identify the local vector, and then a temporal interpolation method is used on the local vector and the surrounding area. If this temporal method gives good results it may be used, otherwise the method of the present invention is performed. If no horizontal edge region is detected, the temporal method may be used on another area.

It will be understood by those skilled in the art that the invention may be implemented by a software program product adapted to run on any suitable computer to carry out the methods described above. Another possibility is that a dedicated hardware/software image processing system may be constructed to perform the methods described above.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method comprising:
    on a digital device, classifying one or more missing pixels of an interlaced image with missing pixels as part of a horizontal edge region, a smooth region, a vertical edge region or a texture region by performing a texture analysis;
    based at least in part on the classifying, selecting, on the digital device, a de-interlacing method out of a plurality of de-interlacing methods for adding the one or more missing pixels to the interlaced image; and
    on the digital device, performing the selected de-interlacing method to add the one or more missing pixels to the interlaced image.

2. The method of claim 1, wherein performing a texture analysis comprises performing horizontal edge detection, by, for respective missing pixels:
    computing a measure of local horizontal high frequency activity and a measure of local vertical high frequency activity; and
    in response to the local horizontal high frequency activity being lower than a pre-defined threshold and the local vertical high frequency activity being higher than a pre-defined threshold, classifying the missing pixel as a horizontal edge pixel.

3. The method of claim 2, wherein:
    computing the measure of local vertical high frequency activity comprises obtaining an output of a vertical high pass filter; and
    computing the measure of local horizontal high frequency activity comprises obtaining an output of a horizontal high pass filter.

4. The method of claim 2, wherein, when the one or more missing pixels are classified as belonging to a horizontal edge region:
    selecting the de-interlacing method comprises selecting a vector matching de-interlacing method; and
    performing the selected de-interlacing method comprises performing the vector matching de-interlacing method to horizontal edge pixels.

5. The method of claim 4, wherein performing the vector matching de-interlacing method comprises:
    choosing a local vector by combining adjacent horizontal edge pixels;
    choosing a search range which contains candidate directions to be considered;
    computing a mismatch measure between two adjacent lines for candidate directions in the chosen search range, using pixels corresponding to the combined adjacent horizontal edge pixels;
    choosing a direction that reduces mismatch; and
    generating a value for the adjacent horizontal edge pixels by taking the average of the pixel values in the chosen direction.

6. The method of claim 5, wherein the combined adjacent horizontal edge pixels are in the same row.

7. The method of claim 5, wherein choosing the search range comprises selecting a search range value based at least in part on the number of combined adjacent horizontal edge pixels.

8. The method of claim 7, wherein selecting a search range value comprises selecting a value greater than or equal to $(L+2)/2$, where L is the number of combined adjacent horizontal edge pixels.

9. The method of claim 5, wherein the mismatch measure comprises a sum of absolute error values, or a sum of square error values.

10. The method of claim 5, wherein choosing a direction comprises choosing a same direction for combined adjacent horizontal edge pixels.

11. The method of claim 5, wherein performing the vector matching de-interlacing method further comprises removing a candidate direction unless a current horizontal edge pixel is part of a line of significant length in the candidate direction.

12. The method of claim 5, wherein performing the vector matching de-interlacing method further comprises removing a candidate direction for a current horizontal edge pixel unless:
    there exists a horizontal edge passing through the current horizontal edge pixel, or
    the current horizontal edge pixel is at the end of a horizontal edge.

13. The method of claim 5, wherein performing the vector matching de-interlacing method further comprises:
    initially setting respective horizontal edge consistency indicators to 0 for respective horizontal edge pixels;
    changing a horizontal edge consistency indicator for a first candidate direction for a first horizontal edge pixel to 1 in response to determining that there exists a first horizontal edge passing through the first horizontal edge pixel, or the first horizontal edge pixel is at the end of a second horizontal edge; and removing a second candidate direction for a second horizontal edge pixel, unless a sum of horizontal edge consistency indicators for the second candidate direction for the adjacent horizontal edge pixels is larger than a pre-determined threshold.

14. The method of claim 1, wherein, in response to the one or more missing pixels being classified as belonging to a vertical edge region:
  selecting the de-interlacing method comprises selecting a modified edge-based line averaging process; and
  performing the selected de-interlacing method comprises performing the modified edge-based line averaging process.

15. The method of claim 14, wherein performing a modified edge-based line averaging process comprises:
  computing a mismatch measure in several possible directions using a fixed neighborhood of pixels; and
  choosing the edge direction that gives the minimum mismatch; and
  averaging missing pixels along the edge direction.

16. The method of claim 1, wherein, in response to the one or more missing pixels being classified as belonging to a texture region:
  selecting the de-interlacing method comprises selecting a vertical averaging process; and
  performing the selected de-interlacing method comprises performing the vertical averaging process.

17. The method of claim 1, wherein, in response to the one or more missing pixels being classified as belonging to a smooth region:
  selecting the de-interlacing method comprises selecting a vertical averaging process or a modified edge-based line averaging process; and
  performing the selected de-interlacing method comprises performing the vertical averaging process or the modified edge-based line averaging process.

18. One or more computer-readable media containing instructions which, if executed by a computer cause the computer to perform a method for adding missing pixels to an interlaced image with rows of pixels missing, the method comprising:
  classifying by the computer, one or more missing pixels as part of a horizontal edge region, a smooth region, a vertical edge region or a texture region;
  based at least in part on the classifying, selecting by the computer a de-interlacing method out of a plurality of de-interlacing methods; and
  performing by the computer, the selected de-interlacing method for the one or more missing pixels.

19. The computer-readable media of claim 18, wherein classifying by the computer, one or more missing pixels as part of a horizontal edge region, a smooth region, a vertical edge region or a texture region comprises performing a texture analysis comprising performing horizontal edge detection, by, for respective missing pixels:
  computing a measure of local horizontal high frequency activity and a measure of local vertical high frequency activity; and
  when the local horizontal high frequency activity is lower than a pre-determined threshold and the local vertical high frequency activity is higher than a pre-determined threshold, classifying the missing pixel as a horizontal edge pixel.

20. The computer-readable media of claim 19, wherein:
  computing the measure of the local vertical high frequency activity comprises obtaining an output of a vertical high pass filter; and
  computing the measure of the local horizontal high frequency activity comprises obtaining an output of a horizontal high pass filter.

21. The computer-readable media of claim 18, wherein, in response to the one or more missing pixels being classified as belonging to a horizontal edge region:
  selecting the de-interlacing method comprises selecting a vector matching de-interlacing method; and
  performing the selected de-interlacing method comprises performing the vector matching de-interlacing method to horizontal edge pixels.

22. The computer-readable media of claim 21, wherein performing the vector matching de-interlacing method comprises:
  choosing a local vector by combining adjacent horizontal edge pixels;
  choosing a search range which contains candidate directions to be considered;
  computing a mismatch measure between two adjacent lines for the candidate directions in the chosen search range, using pixels corresponding to the combined adjacent horizontal edge pixels;
  choosing a direction that reduces mismatch; and
  generating a value for the adjacent horizontal edge pixels by taking the average of the pixel values in the chosen direction.

23. The computer-readable media of claim 22, wherein the combined adjacent horizontal pixels are in the same row.

24. The computer-readable media of claim 22, wherein choosing the search range comprises selecting a search range value based at least in part on the number of combined adjacent horizontal edge pixels.

25. The computer-readable media of claim 24, wherein selecting a search range value comprises selecting a value greater than or equal to $(L+2)/2$, where L is the number of combined adjacent horizontal edge pixels.

26. The computer-readable media of claim 24, wherein the mismatch measure comprises a sum of absolute error values, or a sum of square error values.

27. The computer-readable media of claim 22, wherein choosing a direction comprises choosing a same direction for combined adjacent horizontal edge pixels.

28. The computer-readable media of claim 22, wherein performing the vector matching de-interlacing method further comprises removing a candidate direction unless the current horizontal edge pixel is part of a line of significant length in the candidate direction.

29. The computer-readable media of claim 22, wherein performing the vector matching de-interlacing method further comprises removing a candidate direction for a current horizontal edge pixel unless:
  there exists a horizontal edge passing through the current horizontal edge pixel, or the current horizontal edge pixel is at the end of a horizontal edge.

30. The computer-readable media of claim 22, wherein performing the vector matching de-interlacing method further comprises:
  initially setting respective horizontal edge consistency indicators to 0 for respective horizontal edge pixels;
  changing a horizontal edge consistency indicator for a first candidate direction for a first horizontal edge pixel to 1 in response to determining that there exists a first horizontal edge passing through the first horizontal edge pixel, or the first horizontal edge pixel is at the end of a second horizontal edge; and
  removing a second candidate direction for a second horizontal edge pixel, unless a sum of the horizontal edge consistency indicators for the second candidate direction for the adjacent horizontal edge pixels is larger than a pre-determined threshold.

31. The computer-readable media of claim 18, wherein in response to the one or more missing pixels being classified as belonging to a vertical edge region:
selecting the de-interlacing method that comprises selecting a modified edge-based line averaging process; and
performing the selected de-interlacing method comprises performing the modified edge-based line averaging process.

32. The computer-readable media of claim 31, wherein performing a modified edge-based line averaging process comprises:
computing a mismatch measure in several possible directions using a fixed neighborhood of pixels; and
choosing the edge direction that gives the minimum mismatch; and
averaging missing pixels along the edge direction.

33. The computer-readable media of claim 18, wherein in response to the one or more missing pixels being classified as belonging to a texture region:
selecting the de-interlacing method comprises selecting a vertical averaging process; and
performing the selected de-interlacing method comprises performing the vertical averaging process.

34. A system comprising:
digital means for classifying one or more missing pixels of an interlaced image with missing pixels as part of a horizontal edge region, a smooth region, a vertical edge region or a texture region;
digital means for selecting a de-interlacing method of adding missing pixels to the interlaced image out of a plurality of de-interlacing methods; and
digital means for performing the selected de-interlacing method to add missing pixels to the interlaced image.

35. The system of claim 34, wherein the means for determining comprises means for performing a texture analysis, including means for determining whether missing pixels comprise part of a horizontal edge region comprising:
means for computing a measure of local horizontal high frequency activity and a measure of the local vertical high frequency activity; and
means for, when the local horizontal high frequency activity is lower than a pre-determined threshold and the local vertical high frequency activity is higher than a pre-determined threshold, classifying the missing pixel as a horizontal edge pixel.

36. The system of claim 35, wherein:
means for computing the measure of local vertical high frequency activity comprises means for obtaining an output of a vertical high pass filter; and
means for computing the measure of local horizontal high frequency activity comprises means for obtaining an output of a horizontal high pass filter.

37. The system of claim 35, wherein, in response to the one or more missing pixels being classified as belonging to a horizontal edge region:
the means for selecting the de-interlacing method comprises means for selecting a vector matching de-interlacing method; and
the means for performing the selected de-interlacing method comprise means for performing the vector matching de-interlacing method to horizontal edge pixels.

38. The system of claim 37, wherein the means for performing a vector matching de-interlacing method comprises:

means for choosing a local vector by combining adjacent horizontal edge pixels;
means for choosing a search range which contains candidate directions to be considered;
means for computing a mismatch measure between two adjacent lines for the candidate directions in the chosen search range, using pixels corresponding to the combined adjacent "horizontal edge pixels";
means for choosing a direction that reduces mismatch, and
means for generating a value for the adjacent horizontal edge pixels by taking the average of the pixel values in the chosen direction.

39. The system of claim 38, wherein the combined adjacent horizontal pixels are in the same row.

40. The system of claim 37, wherein the means for choosing a search range comprises means for selecting a search range value based at least in part on the number of combined adjacent horizontal edge pixels.

41. The system of claim 34, wherein, in response to the one or more missing pixels being classified as belonging to a vertical edge region:
the means for selecting the de-interlacing method comprises means for selecting a modified edge-based line averaging process; and
the means for performing the selected de-interlacing method comprises means for performing the modified edge-based line averaging process.

42. The system of claim 41, wherein means for performing a modified edge-based line averaging process comprises:
means for computing a mismatch measure in several possible directions using a fixed neighborhood of pixels; and
means for choosing the edge direction that gives the minimum mismatch; and
means for averaging missing pixels along the edge direction.

43. The system of claim 34, wherein, when the missing pixels are classified as belonging to a texture region:
the means for selecting the de-interlacing method comprises means for selecting a vertical averaging process; and
the means for performing the selected de-interlacing method comprises means for performing the vertical averaging process.

44. The system of claim 34, wherein, when the missing pixels are classified as belonging to a smooth region:
the means for selecting the de-interlacing method comprises means for selecting a vertical averaging process or a modified edge-based line averaging process; and
the means for performing the selected de-interlacing method comprises means for performing a vertical averaging process or means for employing a modified edge-based line averaging process.

45. A method comprising:
by a digital device, creating a vector from missing pixels in an interlaced image;
by the digital device, choosing a search range which contains candidate directions to be considered;
by the digital device, computing a mismatch measure between two adjacent lines for the candidate directions in the chosen search range, using pixels corresponding to the missing pixels in the vector;
by the digital device, choosing a direction that reduces mismatch; and
by the digital device, generating a value for the missing pixels in the vector by taking the average of the pixel values in the chosen direction.

46. The method of claim 45, wherein creating a vector comprises combining adjacent missing pixels.

47. The method of claim 45, wherein choosing the search range comprises selecting a search range value based at least in part on the number of missing pixels in the vector.

48. The method of claim 45, wherein choosing a direction comprises choosing a same direction for the missing pixels in the vector.

49. The method of claim 45, further comprising removing by the digital device, a candidate direction for a current horizontal edge pixel unless:
- there exists a first horizontal edge passing through the current horizontal edge pixel, or
- the current horizontal edge pixel is at the end of a second horizontal edge.

50. The method of claim 45, further comprising:
- marking by the digital device, a horizontal edge consistency indicator for a first candidate direction for a first missing pixel in response to determining that there exists a horizontal edge passing through the first missing pixel, or determining the first horizontal edge pixel is at the end of a horizontal edge; and
- removing by the digital device, a second candidate direction for a second missing pixel, unless sufficient horizontal edge consistency indicators are marked the second candidate direction for the adjacent missing pixels is larger than a pre-determined threshold.

51. A system comprising:
- a storage memory, configured to store an interlaced image having one or more rows of missing pixels;
- a processor coupled to the storage memory;
- a plurality of de-interlacing modules configured to operate on the processor to add missing pixels in the interlaced image;
- a texture analyzer configured to:
  - operate on the processor to analyze one or more missing pixels out of the one or more rows of missing pixels; and
  - based at least in part on the analyzing, select at least one of the plurality of de-interlacing modules to de-interlace the one or more missing pixels in the interlaced image.

52. The system of claim 51, wherein the texture analyzer is configured to classify the one or more missing pixels as part of a smooth region, a texture region, a vertical edge region, or a horizontal edge region.

53. The system of claim 51, wherein the texture analyzer comprises a horizontal edge detector.

54. The system of claim 53, wherein the horizontal edge detector comprises one or more high pass filters.

55. The system of claim 53, wherein the horizontal edge detector is configured such that, in response to the horizontal edge detector detecting that the one or more missing pixels are in a horizontal edge region, the texture analyzer selects a vector matching de-interlacing module to de-interlace the interlaced image.

56. The system of claim 55, wherein the vector matching de-interlacing module comprises a search range estimation module.

57. The system of claim 56, wherein the vector matching de-interlacing module further comprises a direction estimation module.

58. The system of claim 57, wherein the direction estimation module is configured to select a direction with a low error measurement as an estimated direction.

59. The system of claim 58, wherein the vector matching de-interlacing module is configured to interpolate the one or more missing pixels along the estimated direction.

60. The system of claim 51, wherein the texture analyzer comprises a texture detector.

61. The system of claim 60, wherein the texture detector is configured such that, in response to the horizontal edge detector detecting that the one or more missing pixels are in a texture region, the texture analyzer selects a vertical averaging de-interlacing module to de-interlace the interlaced image.

62. The system of claim 60, wherein the texture detector is configured such that, in response to the horizontal edge detector detecting that the one or more missing pixels are not in a texture region, the texture analyzer selects a modified edge-based line averaging de-interlacing module to de-interlace the interlaced image.

* * * * *

UNITED STATES PATENT AND TRADEMARK OFFICE
CERTIFICATE OF CORRECTION

| | |
|---|---|
| PATENT NO. | : 7,907,209 B2 |
| APPLICATION NO. | : 11/433630 |
| DATED | : March 15, 2011 |
| INVENTOR(S) | : Au et al. |

It is certified that error appears in the above-identified patent and that said Letters Patent is hereby corrected as shown below:

Title page, item (56), under "Other Publications", in Column 2, Line 10, delete "Cmmunications" and insert -- Communications --.

Title page, item (57), under "Abstract", in Column 2, Line 4, delete "deinterlacing" and insert -- de-interlacing --.

Title page, item (57), under "Abstract", in Column 2, Line 7, delete "deinterlacing" and insert -- de-interlacing --.

Column 16, line 8, in Claim 38, delete ""horizontal edge pixels";" and insert -- horizontal edge pixels; --.

Signed and Sealed this
Sixteenth Day of August, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,907,209 B2 | |
| APPLICATION NO. | : 11/433630 | |
| DATED | : March 15, 2011 | |
| INVENTOR(S) | : Vu et al. | |

It is certified that error appears in the above-identified patent and that said Letters Patent is hereby corrected as shown below:

Title Page, Item (75) Inventors:
"Chi-Lim Oscar Au" should read -- Oscar Chi-Lim Vu --.

Signed and Sealed this
Twenty-third Day of August, 2011

David J. Kappos
*Director of the United States Patent and Trademark Office*